US012446468B2

(12) United States Patent
Carr (10) Patent No.: US 12,446,468 B2
(45) Date of Patent: *Oct. 14, 2025

(54) INTEGRATED BATTERY COMPRISING A SECONDARY BATTERY WITH CHARGE MAINTAINED BY A SEMICONDUCTOR BATTERY (71) Applicant: William N Carr, Gainesville, FL (US)

(72) Inventor: William N Carr, Gainesville, FL (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/607,974

(22) Filed: Mar. 18, 2024

(65) Prior Publication Data

US 2025/0295033 A1 Sep. 18, 2025

(51) Int. Cl.
*H10N 10/17* (2023.01)
*H01M 10/42* (2006.01)
*H01M 10/46* (2006.01)

(52) U.S. Cl.
CPC .......... *H10N 10/17* (2023.02); *H01M 10/425* (2013.01); *H01M 10/46* (2013.01)

(58) Field of Classification Search
CPC ......... H10N 10/10; H10N 10/13; H01N 10/17
See application file for complete search history.

(56) References Cited

U.S. PATENT DOCUMENTS

| | | | |
|---|---|---|---|
| 9,006,857 B1 * | 4/2015 | Carr | G01J 5/023 257/209 |
| 11,231,382 B2 | 1/2022 | Carr | |
| 11,300,453 B2 | 4/2022 | Carr | |
| 11,381,761 B2 | 7/2022 | Carr | |
| 11,469,433 B2 | 10/2022 | Zehda et al. | |
| 11,522,201 B1 * | 12/2022 | Wasko | H01M 10/6572 |
| 11,961,988 B1 * | 4/2024 | Carr | H10N 10/82 |
| 2021/0196962 A1 * | 7/2021 | Zebda | H01M 8/16 |
| 2022/0149022 A1 * | 5/2022 | Goto | H01J 45/00 |
| 2023/0223770 A1 * | 7/2023 | Chen | H01M 10/482 320/134 |

OTHER PUBLICATIONS

Kinsella et al., "Battery charging considerations in small scale electricity generation from a thermoelectric module," Applied Energy 114 (2014) 80-80 (copy provided). (Year: 2014).*

* cited by examiner

*Primary Examiner* — Amanda J Barrow (57) ABSTRACT

A semiconductor primary battery is packaged with a secondary rechargeable battery to provide an integrated battery. The primary battery operation is based on a pixelated array of thermocouples which extracts power from the surrounding unheated thermal environment. An internal temperature differential is obtained with phononic MEMS structured micro-platforms. Pixels in the primary battery permit charging the secondary battery. The operating temperature range and lifetime of the integrated battery are limited primarily by the secondary rechargeable battery which degrades over time.

18 Claims, 12 Drawing Sheets

INTEGRATED BATTERY COMPRISING A SECONDARY BATTERY WITH CHARGE MAINTAINED BY A SEMICONDUCTOR BATTERY

FIELD OF THE INVENTION

This invention relates generally to an electric battery comprising a semiconductor-based primary micro-battery formed without a chemical electrolyte, and packaged with a secondary rechargeable electrolyte battery.

BACKGROUND OF THE INVENTION

The invention is an electrical integrated battery (IB) configured with a semiconductor primary battery (SPB) and a rechargeable secondary battery (RSB). The SPB comprises both photonic and phononic microelectromechanical structure (MEMS) configured with both photonic and phononic structural elements. The integrated battery (IB) is packaged with the SPB and RSB together.

The field of MEMS devices has important applications across a broad range of technologies including semiconductor integrated circuits including applications based on 3-dimensional structuring. The first semiconductor MEMS device was disclosed by H. Nathanson and R. Wickstrom in U.S. Pat. No. 3,413,573 issued 1968 as a resonant cantilever semiconductor device, wherein an actuated cantilever modulated the transconductance of a MOSFET transistor to provide an accelerometer device.

4. More recent cantilevered semiconductor MEMS devices include a thermally-actuated single-ended SPST switch with both in-plane (lateral) and out of plane (vertical) actuation disclosed by W. Carr and X-Q Sun in U.S. Pat. No. 5,796,152 issued 1998. A cantilever comprising a thermal MEMS structure with multiple cantilevers providing a capacitive readout is disclosed in G. Fedder and A. Oz, U.S. Pat. No. 7,749,792 issued in 2010.

5. In the present invention, the semiconductor primary battery SPB comprises phononic MEMS structure decreasing the thermal conductivity within the internal supporting nanowires to increase thermal isolation for a suspended microplatform. The micro-platform comprises a Seebeck thermocouple which is spontaneously cooled by its own thermal radiation. The integrated micro-battery provides continuous power for an indefinite period of time potentially extending over tens of years of battery life. The lifetime of the integrated battery (IB) is limited primarily by the life of the rechargeable secondary battery (RSB).

Nanowires comprising phononic MEMS structure within a semiconductor sensor device is first disclosed by W. Carr in U.S. Pat. No. 9,006,857 issued Apr. 14, 2015.

More recent patents disclosing phononic MEMS structure include the W. Carr U.S. Pat. Nos. 11,231,382, 11,300,453, 11,309,473 and 11, 381,761 issued in 2022.

SUMMARY

The present in battery (IB) invention is a semiconductor primary battery (SPB) comprising a plurality of pixels wherein each pixel comprises a micro-platform suspended by phononic MEMS nanowires from a surrounding substrate, wherein the SPB trickle charges a rechargeable secondary battery (RSB). The SPB and RSB share a common package.

The semiconductor primary battery (SPB) and rechargeable secondary battery (RSB) are disposed within a single integrated battery (IB) enclosure providing power for an application load device.

The semiconductor primary battery (SPB) uniquely does not comprise any chemical electrolytes The rechargeable secondary battery (RSB) comprises an electrolyte battery or a supercapacitor.

One or more surfaces of the SPB micro-platform is configured to enhance blackbody radiation wherein the blackbody radiation cools the platform spontaneously. This is a unique feature of the SPB pixel. Blackbody radiation from the micro-platform is partially absorbed into a surrounding cavity wall within the SPB. Blackbody radiation from the micro-platform is defined as first radiation.

The blackbody radiation within the integrated battery (IB) is characterized by the Stefan-Boltzmann equation. The surface of the micro-platform in embodiments is structured with a material such as nanotubes to further increase photonic emissivity and radiation of heat. In this disclosure, micro-platforms are configured with structure to increase spontaneous Planckian blackbody radiation. One or more planar surfaces of the micro-platform, comprise carbon nanotubes (CNTs), graphene, silicon black, carbon black, and gold black characterized by a high emissivity providing an increase in micro-platform spontaneous blackbody radiation.

The micro-platform and nanowires comprise a Seebeck thermocouple creating a voltage as the platform spontaneously cools itself by radiating into the hermetic cavity. The voltage developed from the Seebeck thermocouple disposed on the micro-platform increases with increased spontaneous cooling of the micro-platform. The SPB comprises a plurality of electrically-connected pixels.

Each pixel comprises a Seebeck thermocouple, wherein a first couple is disposed in the micro-platform, and a second couple is connected through nanowires located on the warmer surrounding heat sink. The Seebeck thermoelectric micro-battery voltage from the SPB is created across the couple disposed on the surrounding heat sink.

The thermoelectric Seebeck voltage is proportional to the temperature difference between the micro-platform and the surrounding substrate. This thermoelectric voltage source is connected to charge the rechargeable secondary battery (RSB) over time.

The nanowires are formed with phononic MEMS structure comprising phononic crystal (PnC), and/or randomly disposed scattering elements, wherein the phononic MEMS structure reduces thermal conductivity along the nanowire length.

Elements of the phononic MEMS structure are physically separated by less than the mean-free-path (mfp) of at least some heat conducting phonons. The phononic MEMS structure increases the ratio of electrical conductivity to thermal conductivity for the nanowires.

The phononic MEMS structure within the nanowires comprises crystalline or polycrystalline semiconductor material selected from the group including silicon, silicon germanium, silicon carbide, gallium nitride, and complex thermoelectric semiconductors.

The phononic MEMS structure is shaped with structural elements comprising, holes, vias, pillars, surface dots, plugs, cavities, indentions, surface particulates, roughened edges, implanted molecular species, porous structure, and molecular aggregates. Said structural elements are disposed in a periodic or random format.

In embodiments, one or more of the phononic nanowires is structured to include a thin metal film providing increased electrical conductivity within and/or static positioning of said nanowires.

In embodiments, one or more of the phononic nanowires is structured to include a dielectric thin film providing insulation from a metal film or a status strain for nanowire positioning.

Absorptive photonic structure is disposed in at least a portion of the hermetic cavity walls exposed to each micro-platform. One or more of the hermetic cavity walls comprise resonant metamaterial structure increasing absorption of the first radiation, and reduction of the second radiation. Second radiation is defined as the blackbody radiation from the exposed hermetic cavity walls which is incident onto the micro-platform and heats the micro-platform.

The micro-platform and nanowires of each pixel are disposed within one or more hermetic cavities, wherein the hermetic cavity maintains an environment such as a vacuum or a low thermally conductivity gas. Low thermal conductivity gases include such as Ar, Xe, and Kr, providing increased thermal isolation of the platform and nanowires from the surrounding substrate.

Radiation from the exposed absorptive cavity surfaces which heat the micro-platform is defined as second radiation. The absorptive cavity surface metamaterial comprises patterned broadband metallic or dielectric film in single layer or multilayer structure, wherein absorption of first radiation is increased and infrared reflection of first radiation is reduced.

The hermetic cavity is formed by bonding together two or more wafers.

The plurality of pixels are interconnected within a series/parallel circuit providing voltage levels for charging the secondary battery within the integrated battery (IB). In embodiments, the semiconductor primary battery (SPB) voltage is connected through a voltage regulator into the rechargeable secondary battery (RSB).

In embodiments, a voltage regulator circuit (VRC) is connected between the semiconductor primary battery (SPB) and rechargeable secondary battery (RSB) providing regulation of the internal charging voltage and also preventing the SPB from discharging the RSB.

The secondary battery (RSB) is selected from the group, without limitation, of battery types including lithium ion, nickel-cadmium (NiCd), nickel-metal-hydride (NiMH), zinc air, Na-Ni-Chloride.

The primary battery is manufactured in a semiconductor foundry using standard wafer processing tools. The secondary battery RSB is currently in widespread mass production.

In embodiments, the application load device is selected from a group comprising a handheld flashlight, electronic door lock, toxic gas monitor, wall clock.

In embodiments, the application load device is selected from a group of wearable sensors comprising a smart watch, a hearing aid, walking-step counter, and cochlear implant hearing devices.

In embodiments, the application load device is selected from a group of implanted biomedical devices comprising a cardiac defibrillator, a blood oximeter, a blood glucose sensor, and a nerve stimulator.

In embodiments, the application load device is a component within a wireless system comprising a Bluetooth, RFID, or other wireless communication link operational with a mobile phone or other remote interrogator and/or controller devices.

Each micro-platform is formed with a lateral edge dimension ranging from 250 nanometers to 1 millimeter.

The phononic MEMS nanowires are formed with a thickness ranging from 10 nanometers to 1 micrometer.

DETAILED DESCRIPTION

Definitions: The following terms are explicitly defined for use in this disclosure and the appended claims:

"semiconductor primary battery" (SPB) means a semiconductor voltage source, wherein output power is obtained from internal thermally-isolated internal structure spontaneously cooled by blackbody radiation.

"rechargeable secondary battery" (RSB) means a rechargeable battery such as a lithium-ion electrolyte battery comprising a chemical electrolyte, or a supercapacitor.

"phononic MEMS" means a semiconductor structure, wherein thermal conductivity is significantly reduced by a phononic bandgap or randomly-disposed-scattering elements.

"thermocouple" means a thermoelectric device within each pixel comprising two couples electrically-connected via nanowires, wherein one couple is disposed within or immediately adjacent to the micro-platform and the second couple provides the pixel output voltage component within the semiconductor primary battery (SPB). The second couple is maintained at heatsink temperature.

Figure 1A:
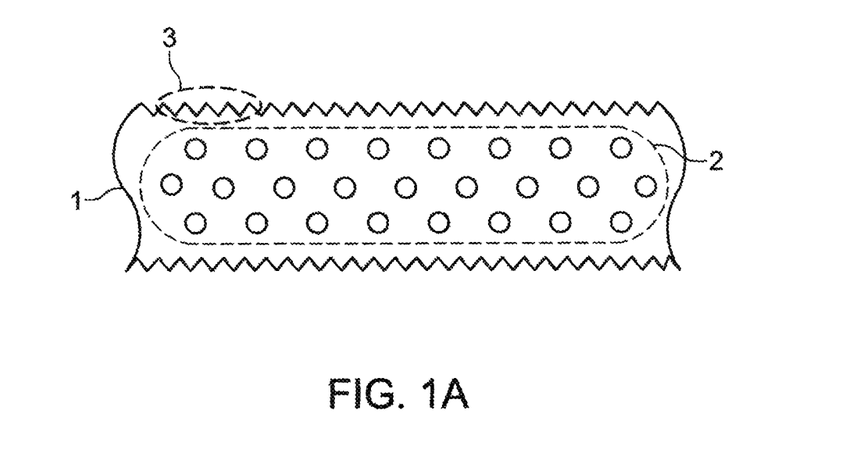
FIGS. 1A and 1B are plan views depicting a section of separate phononic MEMS nanowires.
Figure 1B:
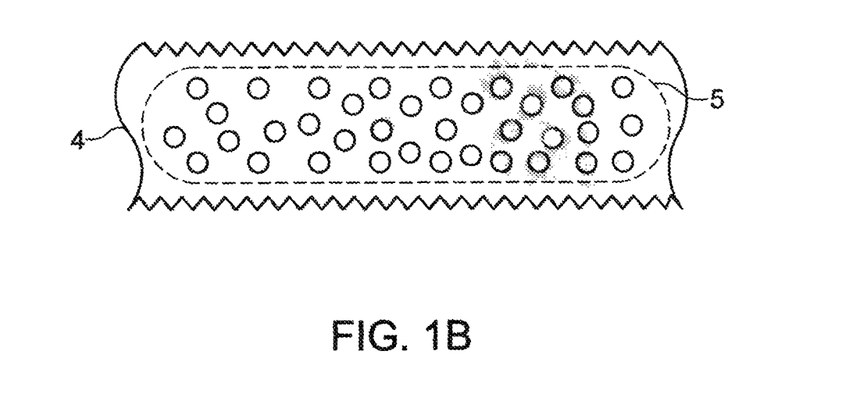

FIGS. 1A and 1B are plan views depicting a portion of a phononic MEMS nanowire within a pixel of the semiconductor primary battery SPB. Phononic structure is depicted in FIG. 1A with "holey" structure 2. The holes are disposed in an orderly fashion to create a phononic bandgap for restricting the flow of heat via phonons along the length of the nanowire. Edge 3 of the nanowire comprises a 1-dimensional phononic MEMS structure.

FIG. 1B is a plan view depicting a nanowire 4 comprising randomly disposed scattering elements 5. These scattering elements wherein the separation between holes is less than the mean free path (mfp) of some thermally conducting phonons.

The phononic structure in FIGS. 1A and 1B, reduces the flow of heat along the length of the nanowire. The ratio of thermal conductivity to electrical conductivity of the semiconductor nanowire is increased. The separation between the elements within phononic MEMS nanowires is designed to be less than the mean free path (MFP) of heat propagating phonons.

Figure 2:
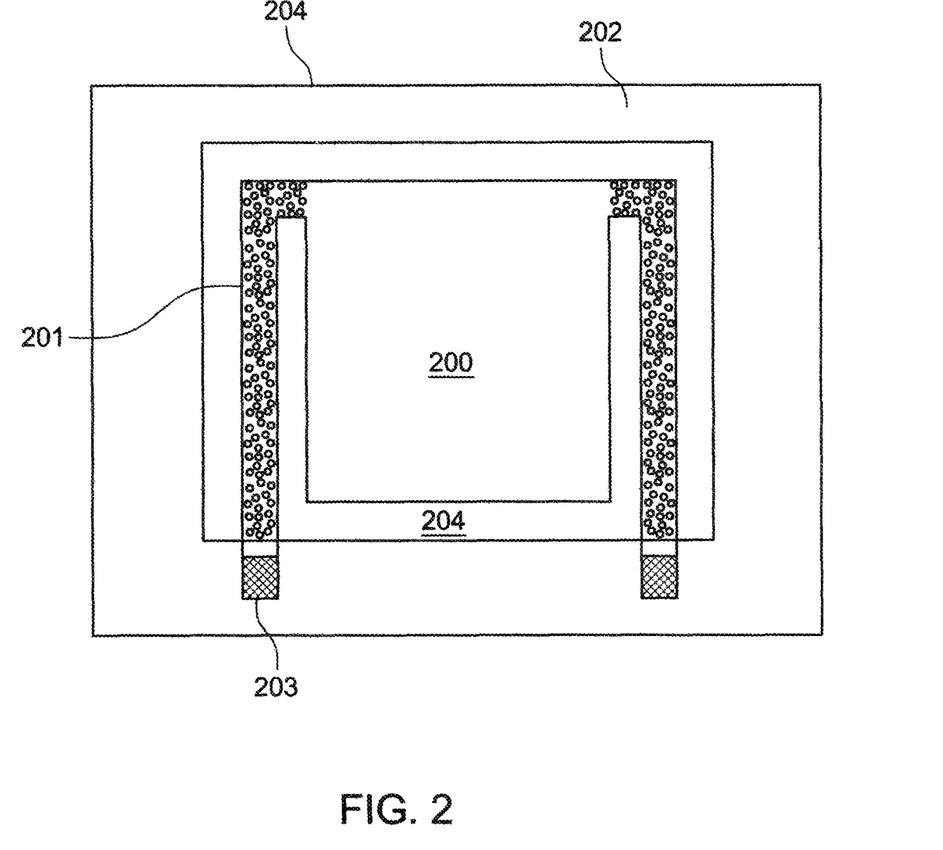
FIG. 2 is a plan view depicting a primary battery PB pixel platform supported by two nanowires.

FIG. 2 is a plan view depicting an SPB pixel with two nanowires 201 supporting a micro-platform 200. Both the nanowires and the micro-platform are suspended over the surrounding substrate 202. The nanowires and micro-platform are suspended over underlying cavity 204. Electrical contacts 203 disposed on the surrounding substrate are further connected to interpixel circuitry within the plurality of pixels.

Figure 3:
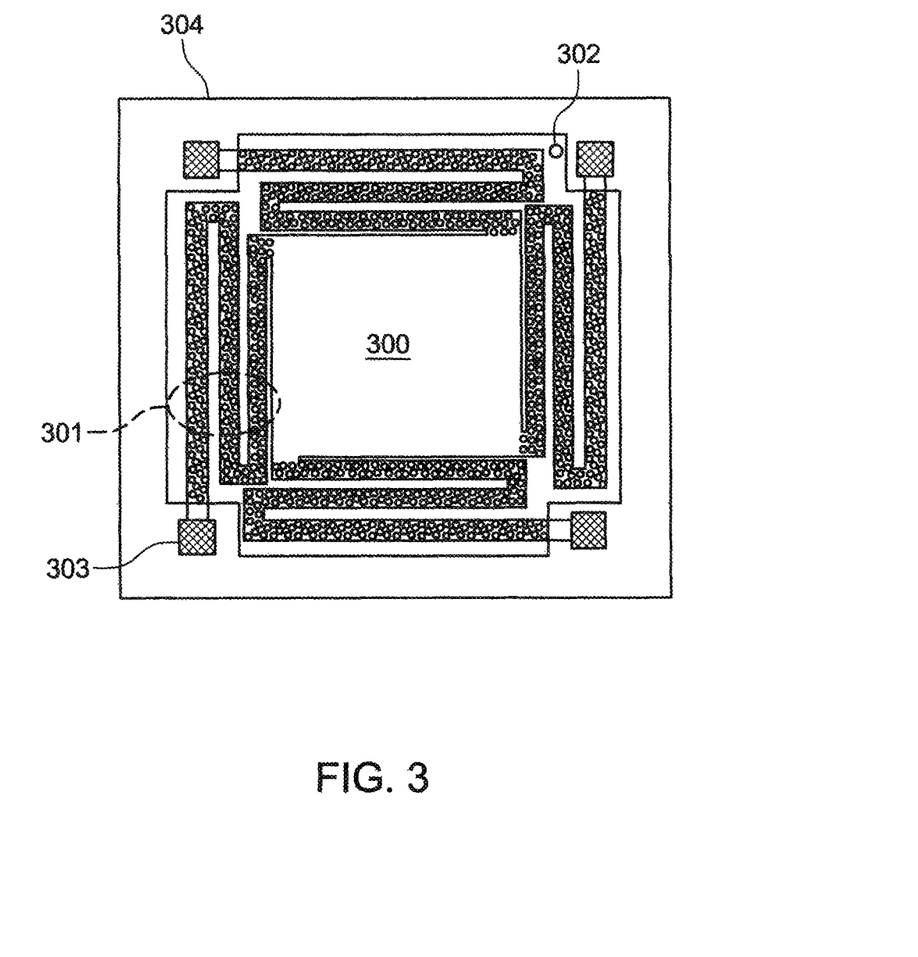
FIG. 3 is a plan view depicting a PB pixel with four nanowires having extended length.

FIG. 3 is a plan view depicting a SPB pixel with four nanowires 301 supporting micro-platform 300, The micro-platform and nanowires are suspended from surrounding substrate 304 over cavity 302 within surrounding substrate 304. Interconnection to other pixels within a larger array of pixels is depicted by contacts 303. This embodiment depicts the pixel with nanowires of substantially extended length providing additional thermal isolation of the micro-platform compared with the pixel of FIG. 2.

Figure 4A:
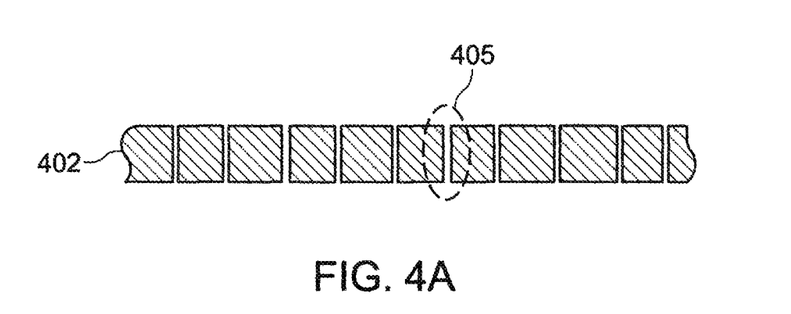
FIG. 4A is a cross-sectional view depicting a nanowire with phononic MEMS structure comprising phononic crystal.
Figure 4B:
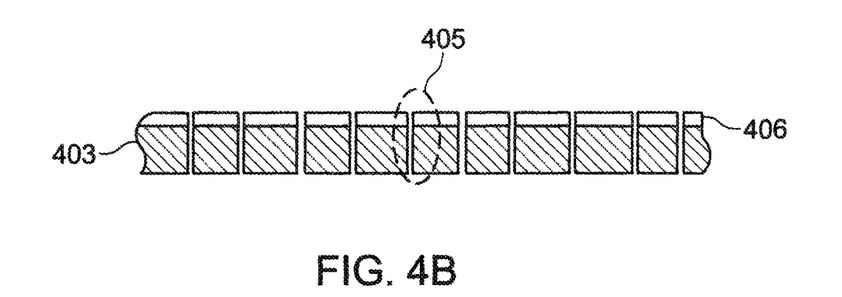
FIG. 4B is a cross-sectional view depicting a phononic nanowire with a thin metal layer.
Figure 4C:
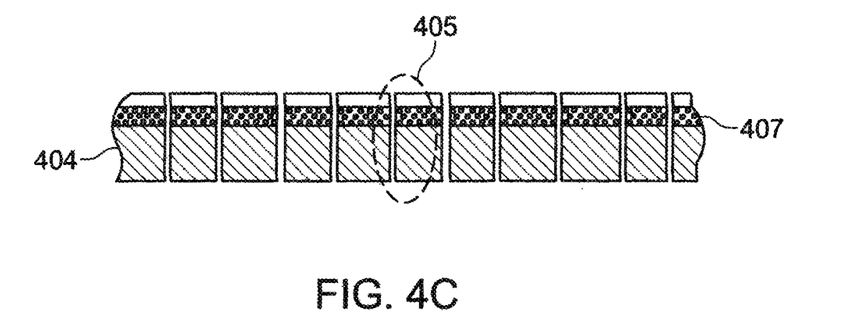
FIG. 4C is a cross-sectional view depicting a phononic nanowire with a dielectric between the metal and semiconductor layers.

In embodiments of the SPB, FIGS. 4A, 4B, 4C are cross-sectional views depicting nanowires with phononic MEMS structure, wherein an additional film is covering the basic phononic MEMS structure 405 within the semiconductor. Embodiments depicted in FIGS. 4A, 4B, 4C comprise phononic crystal (PC) as the phononic structure 405 within each nanowire.

FIG. 4A shows the nanowire 402 with phononic structure comprising phononic elements 405. FIG. 4B depicts the nanowire 403 with an additional layer of thin metal 406 disposed over the phononic crystal 405. The metal layer increases nanowire electrical conductivity.

FIG. 4C depicts the nanowire 404 with a dielectric film 407 providing electrical isolation between a metal film and the phononic nanowire structure. The metal film 406 in the nanowire of FIG. 4C provides an increase in nanowire electrical conductivity. In embodiments, metal film 406 can provide electrical connections for a Peltier thermocouple sharing the same nanowire with the SPB battery providing additional cooling of the platform in specialized embodiments utilizing two of the pixel nanowires. Dielectric film 407 can create a static strain for incremental positioning of the micro-platform as desired.

Figure 5:
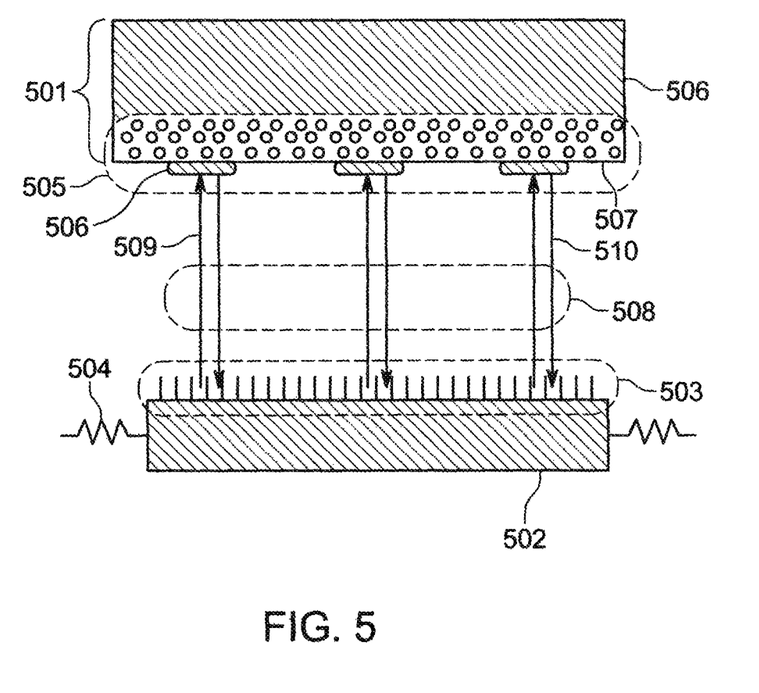
FIG. 5 is a cross-sectional view depicting a micro-platform and adjacent hermetic cavity surface with blackbody radiation sources identified.

FIG. 5 is a cross-sectional view depicting a portion of an SPB pixel wherein the micro-platform 502 supported by nanowires 504 is emitting blackbody first radiation 509 from surface nanotubes 503 into heat absorbing structure 505. The metamaterial heat absorber 505 is disposed on the inner wall of the surrounding hermetic cavity. The micro-platform surface 503 is depicted as carbon nanotubes structured to provide increased infrared emissivity. The metamaterial absorber 505, disposed on substrate 501, comprises plasmonic resonators 506 including dielectric film 507. Metamaterial absorber 505 terminates the blackbody radiation beam from the micro-platform 503. The metamaterial absorber 505 comprises patterned metallic film resonators 506 on a dielectric film 507 providing infrared absorption over broad infrared spectrum.

The cavity wall metamaterial 505 is also an unwanted emitter of spontaneous blackbody second radiation 510. The second radiation is mixed with reflected first radiation from the platform surface 503. The cavity metamaterial absorber 505 is designed in specific embodiments to have a maximum absorption of first radiation, and a reduced emission of second radiation. It is desirable for the net heat flow 508 between the two sources of radiation to be primarily derived from the micro-platform blackbody emission surface 503 and minimally from the cavity wall metamaterial structure 505.

The cross-sectional view in FIG. 5 depicts a portion of the pixel wherein the dominant photonic content within infrared beam 506 originates from the micro-platform surface 503. Radiation from the high emissivity micro-platform surface 503 into the absorber 505 provides the driver, wherein the micro-platform is spontaneously cooled with respect to the surrounding substrate heatsink.

Figure 6:
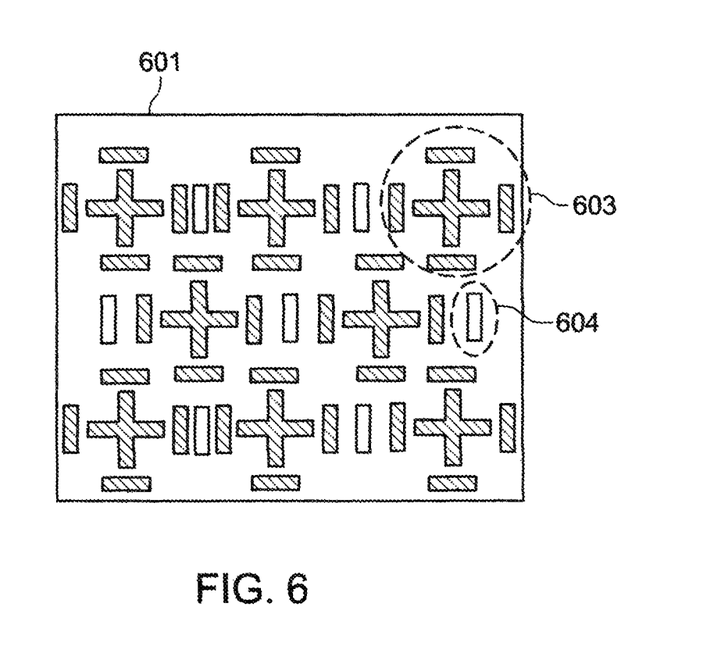
FIG. 6 plan view depicting a broadband infrared absorber for blackbody spontaneous radiation from the micro-platform.

FIG. 6 is a plan view depicting an example of a radiation absorber embodiment 601, corresponding to the absorbent cavity surface 505 of FIG. 5. FIG. 6 is an example of the many specific absorbing structures that can be disposed on the micro-platform to absorb first radiation. The depicted absorber 601 comprises patterned metallic or dielectric resonant structures 603, 604 disposed on a dielectric film. As absorber such as 601 increases the ratio of first radiation to second radiation within MWIR/LWIR wavelength range.

Figure 7:
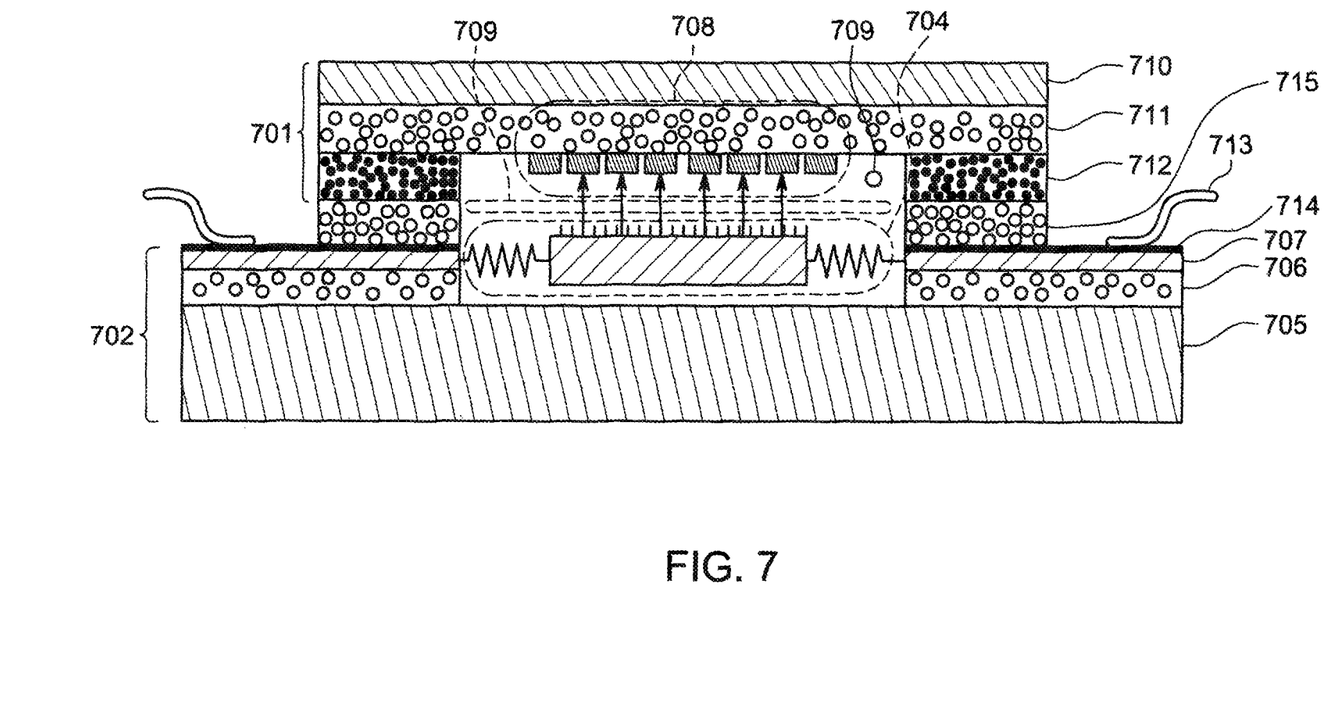
FIG. 7 is a cross-sectional view depicting a PB pixel with net spontaneous radiation absorbed into a single cavity wall.

FIG. 7 depicts a cross-sectional view depicting the pixel in increased detail. Radiation beam 709 intensity is the net infrared emitted from platform, first radiation 704 minus second radiation from the absorber 708. First radiation originates from the surface of micro-platform 704. Second radiation comprises blackbody radiation and reflected first radiation from structure 708 disposed on the exposed cavity wall. First radiation from the micro-platform dominates the infrared beam 709, wherein cavity surface structure 708 absorbs first radiation and reduces second radiation.

The microplatform 704 and nanowires 704 are formed from the semiconductor active layer film 707 of SOI wafer 702. Wafer 702 comprises an active layer 707, BoX oxide layer 706 and substrate 705. In embodiments, carbon nanotubes are grown on the micro-platform 704 surface.

Wafer 702 is further appropriately patterned with interconnect metallization 714 and dielectric film 715.

Wafer 701 is oxidized with dielectric film 711 and patterned with the absorber 708 and metal bonding seal 712, 702 creating a hermetic cavity surrounding the micro-platform and nanowires.

The nanowires and platform 704 are released from the substrate of wafer 702 typically with a vapor HF etch.

Wafers 701 and 702 are next processed by bonding the two wafers together to form a hermetic cavity surrounding the nanowires and platform of pixels. Wafer bonding is generally performed under vacuum or within a low thermal conductivity gas environment to create the hermetic cavity.

Bonding wires 713 depict the interpixel patterned wire connections as the pixel is replicated within an array of pixels. This depiction of a single pixel can be expanded into arrayed SPB designs, wherein the patterned area of the substrates is increased and populated with the plurality of pixels.

Figure 8:
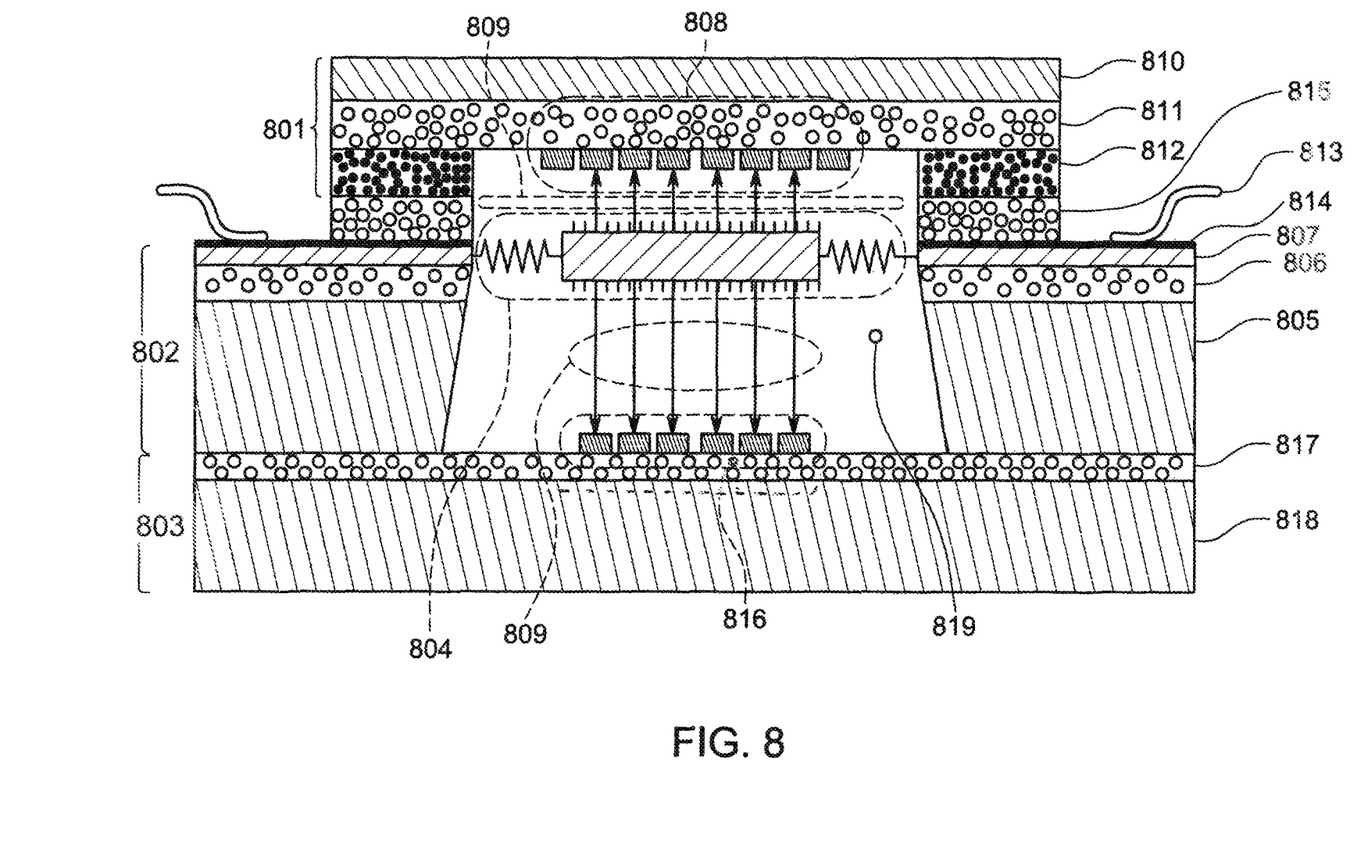
FIG. 8 is a cross-sectional view depicting the PB pixel with radiation from both surfaces of the micro-platform with absorption into respective cavity walls. External array contacts are wire bonded.

FIG. 8 is a cross-sectional view depicting the pixel with first radiation 809 from both sides of the micro-platform, and absorbed into structures 808, 816 disposed on the exposed hermetic cavity walls 819. Infrared plasmonic absorbers 808, 816 are generally multi-level and identical in structure, wherein each provides broadband absorption of first radiation 809. In embodiments, the micro-platform is covered on both sides with carbon nanotubes to increase infrared emissivity. The second absorption structure 816 provides a further increase in the current or voltage supply capability of the pixel.

Processing for this embodiment begins with processing starting SOI wafer 802 comprising active semiconductor layer 807, BoX layer 806, and substrate 818. Wafer 802 is processed to define the nanowires and micro-platform 804 prior to release. Pixel Interconnects 807 and regions of the active layer 806 are patterned appropriately, Patterned dielectric layer 815 is mated with the patterned metal film 812 in the wafer bonding process step.

The nanowires and platform 704 are released from the substrate of wafer 702 with a vapor HF etch.

Wafer 801 with dielectric layer 811 and substrate 810 is processed create infrared absorbent structure 808, and patterned metal film 812.

The next process step is to bond wafers 801 and 802. Bonding is performed at higher temperature with the metal film seal 812 of wafer 801 aligned with the dielectric film 815 creating the upper portion of hermetic cavity 819.

Wafer 803 with surface film 817 and substrate 818 is processed to define surface absorption structure 816.

Next, bonded wafers 801, 802 are bonded with processed wafer 803 to complete the pixel structure. Pixel interconnects are depicted as peripheral wire bonds 813 with connections to metalizations 814 which include circuits for parallel/series pixel circuit connections.

In specific embodiments, the pixel of FIG. 8 is replicated within an array of pixels. The metal seal 812 in embodiments may create a hermetic cavity for one or more of platform structures 804.

In a preferred embodiment, the wafer bonding wires 814 are connected only around the periphery of the plurality of nanowires and platforms 804.

Figure 9:
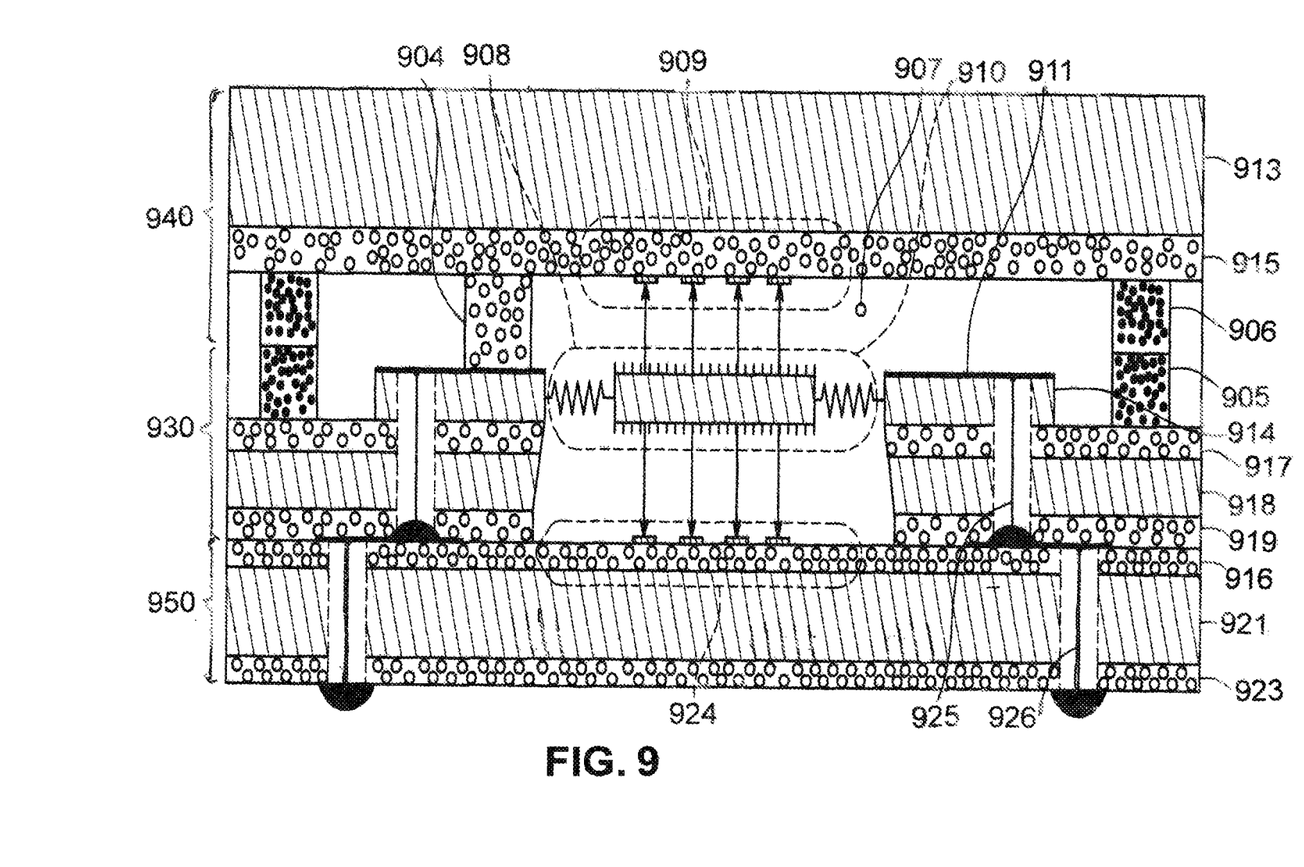
FIG. 9 is a cross-sectional view depicting the PB pixel with radiation from both surfaces of the micro-platform absorbed into respective cavity walls. External contacts are formed as through-semiconductor-vias (TSVs).

NEW FIG. 9 is an embodiment similar to FIG. 8, wherein connection to the nanowires and platform 908, 910 is provided through semiconductor-vias (TSVs). The FIG. 9 cross-sectional view depicts a pixel, wherein radiation from the platform with nanowires 908, 910 is absorbed into an upper absorbent structure 909 and lower absorbent structure 924.

In this embodiment, SOI wafer 930 comprising active layer 914, BoX layer 917, surrounding substrate 918, TSV structure 925, and patterned dielectric film 919 is processed to define the nanowires and platform 908, 910 with patterned bonding metal 905, and dielectric spacer 904. Topside wafer 940 with dielectric film 915 and substrate 913 is processed further to create absorptive structure 909.

Next, processed wafers 930, 940 are bonded at elevated temperature, wherein the patterned metal films 905, 906 are mated to create hermetic cavity 907.

A third wafer 950 with both sides oxidized 916, 923 is configured with an absorptive structure 924 similar to the absorptive structure 909 of wafer 940. Multiple photomasking steps with metallizations are performed to create the TSV interconnections 926.

The pixel depicted in FIG. 9 has additional lithographic masks and metal depositions to define the multiple TSV structures into wafer 930 and 950.

FIG. 9 is representative of a class preferred embodiments wherein external contacts are provided by through-semiconductor-vias (TSVs).

Figure 10:
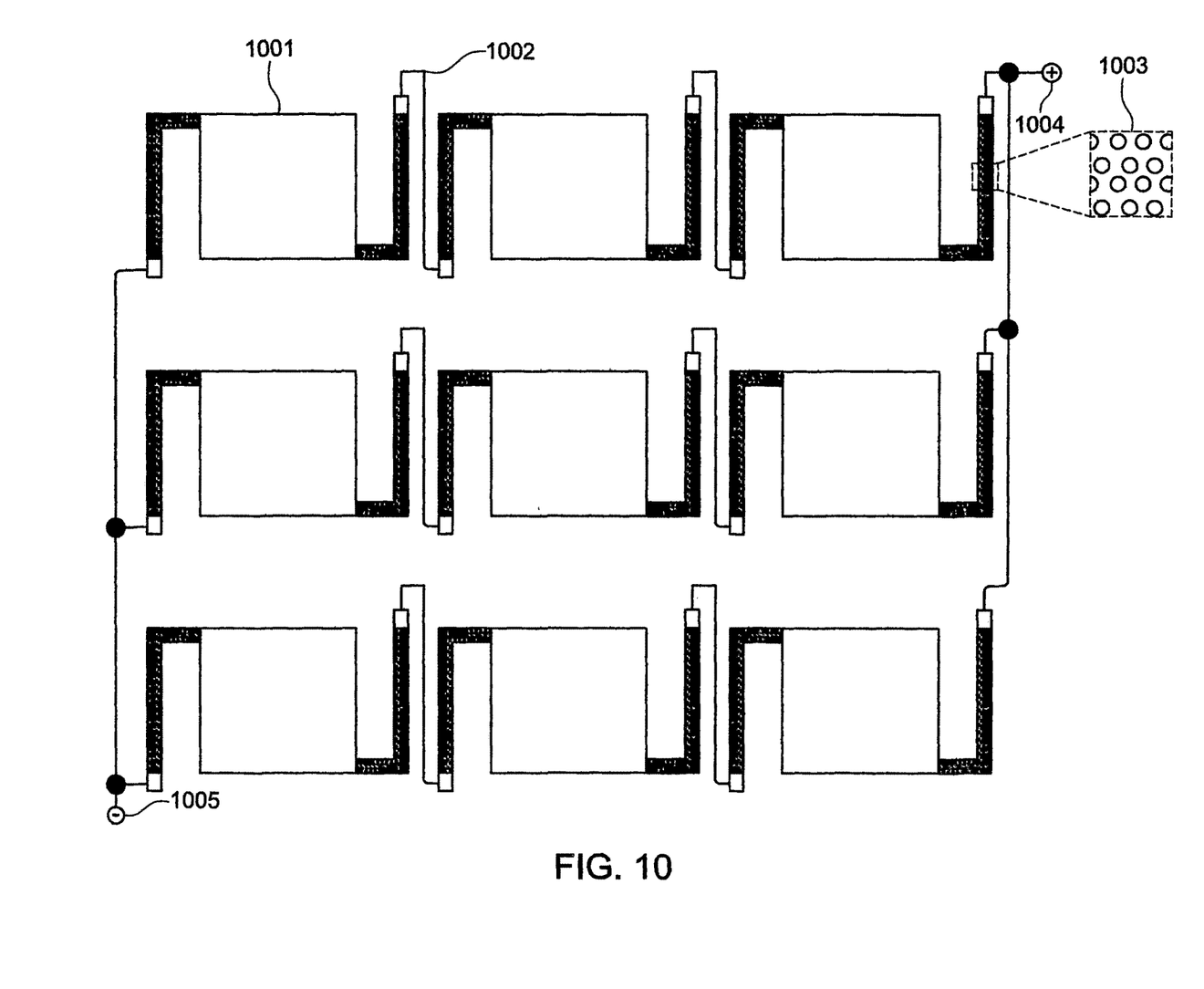
FIG. 10 is a plan view depicting a plurality of the PB pixels connected within a series/parallel circuit array.

FIG. 10 is a plan view depicting a plurality of the pixel platform 1001 and nanowires 1003 with pixel interconnections 1002 disposed within a 3×3 pixel circuit array. The circuit example has three pixel groups connected in parallel, wherein each pixel group comprises three series-connected pixels. Output voltage of the pixel array is obtained at terminals 1004, 1005.

Figure 11:
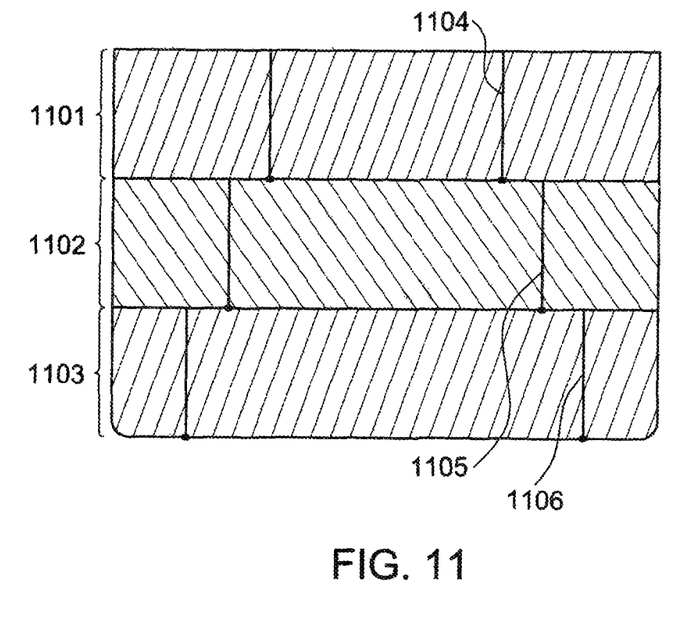
FIG. 11 is a cross-sectional view depicting three stacked arrays of PB pixels with interconnect formed with TSV feedthrough structures.

FIG. 11 is a cross-sectional view depicting three stacked pixel arrays 1101, 1102, 1103, wherein the array layers are connected with TSV structures 1104. The stacked pixel arrays in embodiments may comprise multiple pixelated levels with the TSV example of FIG. 9.

Figure 12:
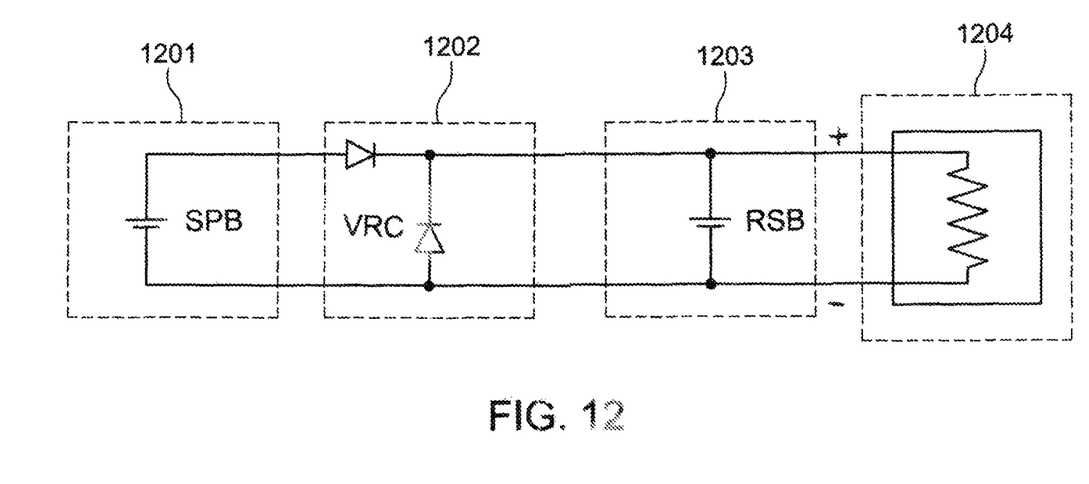
FIG. 12 is a circuit schematic with connected semiconductor primary micro-battery (SPB), voltage regulator circuit (VRC), rechargeable secondary battery (RSB) and an application load device.

FIG. 12 is a block diagram depicting the integrated battery (IB) in the voltage regulator circuit (VRC) embodiment. The semiconductor primary battery (SPB) output power is controlled through the voltage regulator circuit (VRC) for input into the rechargeable secondary battery (RSB). The RSB supplies power to application load device 1204.

Figure 13:
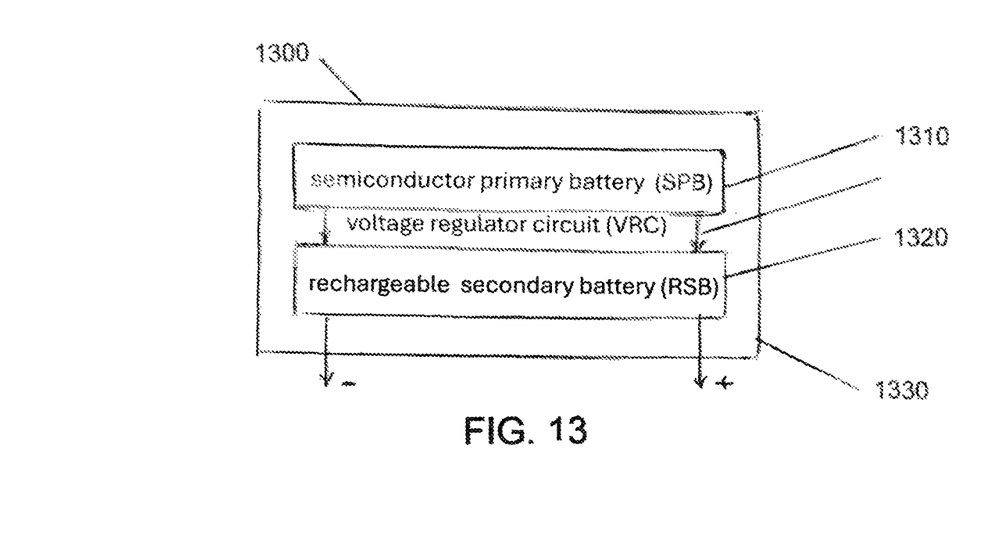
FIG. 13 depicts the physical stacking within the integrated battery (IB).

The embodiment of FIG. 13 is a schematic diagram of the integrated battery (IB) 1300 comprising three main components, the SPB 1310, the VRC 1320, and the RSB 1330.

It is to be understood that although the disclosure teaches many examples of embodiments in accordance with the present teachings, many additional variations of the invention can easily be devised by those skilled in the art after reading this disclosure. As a consequence, the scope of the present invention is to be determined by the following claims.

What is claimed is:

1. An integrated battery (IB) comprising a rechargeable secondary battery (RSB) with continuous charging from a semiconductor primary battery (SPB), wherein:

the semiconductor primary battery (SPB) comprises a plurality of pixels, each pixel comprises a micro-platform suspended by phononic MEMS nanowires from a surrounding substrate within a hermetic cavity;

one or more surfaces of the micro-platform is configured to enhance a first blackbody radiation which spontaneously cools the micro-platform continuously;

the micro-platform and nanowires form are formed within a Seebeck thermocouple powered by the temperature difference between the micro-platform and the surrounding substrate providing electric power for an external load circuit;

the nanowires are formed with phononic MEMS structure comprising phononic crystal (PnC), and/or randomly disposed scattering elements, wherein the phononic MEMS structure reduces thermal conductivity along the nanowire length;

the micro-platform and nanowires are disposed within the hermetic cavity, wherein the hermetic cavity maintains an environment within, such as a vacuum, or low thermal conductivity gas providing increased thermal isolation of the micro-platform and nanowires from the surrounding substrate;

elements of the phononic MEMS structure are physically separated by less than the mean-free-path (mfp) of at least some heat conducting phonons;

the phononic MEMS structure increases the ratio of electrical conductivity to thermal conductivity for the nanowires;

at least one of the hermetic cavity inner surfaces is exposed to the micro-platform, wherein blackbody radiation incident from the micro-platform is substantially absorbed and the at least one hermetic cavity inner surface comprises photonic absorptive structure which reduces a second blackbody radiation and reflection of the first blackbody radiation from said at least one hermetic cavity inner surface;

the plurality of SPB pixels are interconnected to form a series/parallel circuit providing a voltage level suitable for charging the rechargeable secondary battery (RSB) disposed within the integrated battery (IB); and, the integrated battery (IB) is configured to supply power for an application load device.

2. The integrated battery (IB) of claim 1, wherein the rechargeable secondary battery is selected from the group comprised of: a lithium ion rechargeable secondary battery, a nickel-cadmium (NiCd) rechargeable secondary battery, a nickel-metal-hydride (NiMH) rechargeable secondary battery, a Na—Ni-chloride rechargeable secondary battery, and a zinc air rechargeable secondary battery.

3. The integrated battery (IB) of claim 1 wherein the phononic MEMS structure within the nanowires comprise crystalline or polycrystalline semiconductor material selected from the group including, silicon, silicon germanium, silicon carbide, gallium nitride, and complexsemiconductors.

4. The integrated battery (IB) of claim 1, wherein the phononic MEMS structure comprises structural elements such as holes, vias, pillars, surface dots, plugs, cavities, indentions, surface particulates, roughened edges, implanted molecular species, porous structure, and molecular aggregates, and the structural elements are disposed in a periodic or random format.

5. The integrated battery (IB) of claim 1, wherein some of the phononic nanowires are structured to include a thin film providing increased electrical conductivity within said nanowires and/or static positioning of said nanowires.

6. The integrated battery (IB) of claim 1, wherein one or more surfaces of the micro-platform comprises an absorptive surface configured with broadband metallic or dielectric film resonant structure.

7. The integrated battery (IB) of claim 6, wherein one or more surfaces of the micro-platform-is structured with a field of carbon nanotubes (CNTs), graphene, silicon black, and/or gold black providing an increase in photonic emissivity and spontaneous blackbody radiation.

8. The integrated battery (IB) of claim 1, wherein one or more of the hermetic cavity inner-surfaces are structured with a resonant metamaterial providing increased absorption of the first blackbody radiation over a broad infrared spectrum.

9. The integrated battery (IB) of claim 1, wherein the hermetic cavity is formed by bonding together two or more wafers.

10. The integrated battery (IB) of claim 1, wherein the application load device is selected from a group of stationary or mobile devices comprising a handheld flashlight, electronic door lock, toxic gas monitor, and a wall clock.

11. The integrated battery (IB) of claim 1, wherein the application load device is selected from a group of wearable sensors comprising a smart watch, a hearing aid, walking-step counter, and cochlear implant hearing devices.

12. He integrated battery (IB) of claim 1, wherein the application load device is selected from a group of implanted biomedical devices comprising one or more of a cardiac defibrillator, a blood oximeter, a blood glucose sensor, and a nerve stimulator.

13. The integrated battery (IB) of claim 1, wherein the semiconductor primary battery (SPB) is fabricated in a semiconductor foundry with standard semiconductor processing tools.

14. The integrated battery (IB Of claim 1, wherein electrical contacts to the semiconductor primary battery (SPB) comprise bonded wires or through-semiconductor-vias (TSVs).

15. The integrated (IB) battery of claim 1, wherein; the secondary battery voltage is maintained at near or fully charged voltage with an integral voltage regulator circuit (VRC).

16. The integrated (IB) battery of claim 1, wherein the application load device comprises a Bluetooth, RFID, or other wireless communication device with link operational with a mobile phone or other remote interrogator/controller.

17. The integrated (IB) battery of claim 1, wherein each micro-platform is formed with a lateral edge dimension ranging from 250 nanometers to 1 millimeter.

18. The integrated (IB) battery of claim 1, wherein the nanowires are formed with a thickness ranging from 10 nanometers to 1 micrometer.

* * * * *